(12) United States Patent
Lauret

(10) Patent No.: US 6,252,850 B1
(45) Date of Patent: Jun. 26, 2001

(54) ADAPTIVE DIGITAL CLOCK RECOVERY

(75) Inventor: Régis Lauret, Paris (FR)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/071,269

(22) Filed: May 1, 1998

(30) Foreign Application Priority Data

May 2, 1997 (EP) .................................................. 97400992

(51) Int. Cl.⁷ ........................................................ H04J 3/06
(52) U.S. Cl. .......................... 370/235; 370/356; 370/516; 375/371
(58) Field of Search .................................... 370/235, 356, 370/395, 412, 516, 503; 375/371, 372

(56) References Cited

U.S. PATENT DOCUMENTS

| 4,759,041 | * | 7/1988 | Anderson et al. | 375/371 |
| 5,263,057 | * | 11/1993 | Nawrocki et al. | 375/372 |
| 5,396,492 | * | 3/1995 | Lien | 370/412 |
| 5,526,362 | * | 6/1996 | Thompson et al. | 370/516 |
| 5,844,891 | * | 12/1998 | Cox | 370/235 |
| 6,111,878 | * | 8/2000 | Powell | 370/395 |
| 6,172,964 | * | 1/2001 | Witton | 370/230 |
| 6,195,353 | * | 2/2001 | Westberg | 370/395 |

FOREIGN PATENT DOCUMENTS

| 0 450 269 A2 | 10/1991 | (EP) | H04L/7/04 |
| 0 450 269 A3 | 10/1991 | (EP) | |
| 0 707 398 A1 | 4/1996 | (EP) | H04L/12/56 |

OTHER PUBLICATIONS

A.B.D. Reid and M. Mulvey, "Analytical Methods for Timing Aspects of the Transport of CBR Services over ATM"—BT Technology Journal, vol. 13 No. 3, Jul. 1995, pp. 26–34.

M. Mulvey, I. Y. Kim and A.B.D. Reid, "Timing Issues of Constant Bit Rate Services Over ATM"—BT Technology Journal, vol. 13, No. 3, Jul. 1995, pp. 35–45.

* cited by examiner

Primary Examiner—Min Jung

(57) ABSTRACT

Adaptive clock recovery enables the clock of a CBR service to be recovered, this service being emulated from an ATM transmitter, is provided at an ATM receiver. The fill level of a first buffer receiving a stream of cells is used to provide coarse control of the rate of output of a stream of cells from the first buffer. The fill level of a further, fine, buffer receiving said stream of cells from the first buffer is monitored for determining a clock frequency, corresponding to the service clock frequency, for outputting cells from the fine buffer. The first buffer fill level control provides low pass cell jitter filtering by selectively supplying a first or a second clock frequency for outputting cells from the first buffer. The fine filter fill level control employs a phase locked loop responsive to the current fill level to set a clock frequency for reading out said fine buffer at the service clock frequency.

25 Claims, 3 Drawing Sheets

$f_{OUT}$ IS TOO SLOW $f_{OUT}$ IS STILL TOO SLOW, BUT CELL JITTER APPEARED

ADAPTIVE DIGITAL CLOCK RECOVERY

The invention relates to a method and apparatus for digital clock recovery, in particular for a packet oriented network environment.

An example of a packet oriented transmission technology for the realization of Broadband Integrated Service Networks (BISDN) is the technology called Asynchronous Transfer Mode (ATM). This permits services as diverse as voice, data and video to be transmitted through the same medium and in the same format. The transport of constant bit rate (CBR) data over an ATM network is usually referred to as circuit emulation. The accommodation of constant bit rate (CBR) services by ATM is particularly important, for compatibility with existing systems and future networks, even if ATM is more suitable to the transport of bursty traffic, such as data. One of the critical issues of circuit emulation is the recovery of clock frequency of the source data (the service clock frequency) at the receiver.

ATM's basic transport entity is a 53 byte cell. Five of these bytes are header bytes, and convey information such as link-to-link routing, error correction, service information (priority, payload identifier), and cell type identification. A protocol stack is defined by ITU-T for ATM technology, in which the so-called ATM layer performs operations typically found in layers 2 and 3 of the OSI model. Above the ATM layer is an ATM adaptation layer (AAL), which is divided into segmentation and reassembling layers (SAR) and a convergence sublayer (CS). Five different types of AAL have been defined by ITU-T, covering various applications. The AAL-1 (ATM Adaptation Layer 1) is devoted to CBR services. Of the 48 remaining information bytes of an ATM cell, one used by the AAL1 SAR for functions including timing recovery and cell loss detection which leaves 47 data bytes (376 bits). To transport a CBR service into an ATM network, the data is segmented into cells of 47 bytes, an SAR byte is then added to each cell, the 48 bytes are mapped in an ATM cell and are then sent through the network.

As a result of statistical multiplexing of cells at the source and of queuing delays incurred in ATM switches, successive cells arrive to the destination a periodically. The deviation from ideal arrival time is called cell jitter or cell delay variation (CDV). It obviously increases with the network load, as queuing delays are functions of the switch load. Cell jitter is composed of a relatively high frequency stuffing jitter and of a low frequency waiting time jitter. The problem with cell jitter is that it can be very large, and except for the fact that its average is zero, its characteristics are mostly unknown.

The ITU-T has set output clock jitter recommendations whereby the frequency shift at 2.048 MHz on service clocks is +/−50 ppm (1 ppm=1 part per million=2.048 Hz shift).

In order to achieve clock recovery, the exact source frequency should be recovered at the receiver. However, this is not straightforward due to the problems of output jitter and wander control. Jitter is defined as the higher frequency characteristics of a phase variation on a given clock signal. Wander is the lower frequency part of this phase variation. Both are commonly measured in terms of unit intervals (UI), where one UI corresponds to one cycle of the clock signal. ITU-T recommendation G.823 has precisely defined output jitter limits that must be met if the system is to be compatible with any CBR equipment. The bounds on maximum peak-to-peak output jitter for 2.048 Mbits.s$^{-1}$ CBR services are shown in Table 1.

TABLE 1

| Frequency | 20 Hz–18 kHz | 18 kHz–100 kHz |
|---|---|---|
| Jitter | 1.5 UI | 0.2 UI |

Wander tolerance is not as well defined as output jitter. However, input jitter should not be greater than 36.9 UI under $1.2 \times 10^{-5}$ Hz.

Two methods exist for the recovery of the service clock at a receiver. A first method is referred to as the "synchronous method" and is based on the availability of a common network reference clock between the source and the receiver end equipment. This network clock is distributed by the network, and is available either through the Synchronous Digital Hierarchy (SDH) network or its North American version Synchronous Optical NETwork (SONET).

As not all CBR equipment is able or willing to synchronize on this network clock, a second method referred to as the "adaptive method" recovers the service clock based on the fill-level of an incoming cell buffer.

FIG. 1 of the accompanying drawings illustrates a conventional adaptive clock recovery mechanism 10 formed from a cell buffer 12, a filter 14 and a digitally controlled oscillator 16, responsive to an output of the filter 14. As the arrival time of the ATM cells is used to recover the reception clock in the mechanism of FIG. 1, this leads to a new problem, as depicted in the FIGS. 2A and 2B. As shown in FIG. 2A, the output frequency fout is too slow. In FIG. 2B, the output frequency fout is still too slow, but cell jitter has appeared. As a result cell jitter must be filtered to get a reasonable accuracy. If it is desired accurately to recover the service frequency, the underlying trend in filter fill level evolution must be determined, by filtering the cell jitter. Given that the permissible range for the service clock is very low, (between +/− 50 ppm at 2.048 MHz) and that cell jitter can be very high (Bellcore proposed a 750 ms delay, that is to say four cells, but this cell jitter can be much higher), the result is that noise which can be 10 times higher than our signal needs to be filtered.

Accordingly, there is a need for an improved adaptive technique for recovery of a service clock.

In accordance with a first aspect of the invention, there is provided an adaptive clock recovery mechanism for an ATM receiver for recovering a service clock transmitted via an ATM network, the mechanism comprising: a first buffer having an input for receiving successive ATM cells from the ATM network and an output; a first buffer fill level controller connected to the first buffer for controlling rates of cell output from the first buffer to be within a predetermined range; a second buffer having an input connected to receive cells from the output of the first buffer and an output; and a second buffer fill level controller connected to the second buffer to cause a rate of cell output from the second buffer to be locked substantially to the service clock frequency.

The adaptive clock recovery mechanism enables the clock of a constant bit rate (CBR) service to be recovered at an ATM receiver where the service is being emulated from an ATM transmitter.

The provision of the first buffer and the first buffer fill level controller enables cell jitter to be filtered prior to recovery of the service clock. An embodiment of the invention can provide adaptive, digital recovery of the service clock at a receiver in a manner which filters the cell jitter and recovers the service clock with acceptable clock jitter.

Preferably, wherein the first buffer fill level controller comprises a selectable clock source for supplying a selectable one of at least a first and a second clock frequency for outputting cells from the first buffer, the selectable clock source being responsive to a fill level of the first buffer to select a clock frequency.

The use of first and second clock frequencies dependent on the fill level of the first buffer provides a simple control structure for keeping the rate of output of cells from the first buffer within a predetermined range. The first buffer with its fill level control thus acts as a low pass filter to reduce high frequency cell jitter.

In a preferred embodiment the first clock frequency has a frequency of from+j ppm and the second clock frequency has a frequency of from-j ppm, where fnom is a nominal service clock and 2j defines the predetermined range. The selectable clock source selects the first clock frequency when a fill level of the first buffer is greater than a threshold value and selects the second clock when a fill level of the first buffer is less than the threshold value.

Although in a preferred embodiment only two clock frequencies are used, in other embodiments more clock frequencies, selectable in response to fill levels between corresponding thresholds could be employed.

The selectable clock source could be a multiple frequency clock signal generator. Alternatively, the selectable clock source can comprise a selector having at least first and second clock inputs for respective clock frequencies, a clock output for outputting a clock frequency for controlling the reading of cells from the first buffer and a first buffer fill level input, the selector being arranged to determine a fill level of the coarse buffer and to connect a selected one of the clock inputs to the clock output for supplying a selected clock frequency for controlling the cell output from the first buffer.

Preferably, the second buffer fill level controller comprises a phase locked loop, the phase locked loop comprising a filter connected to the second buffer to determine a fill level of the second buffer and a controlled oscillator for providing a clock signal for reading cells from the second buffer, said controlled oscillator having a control input and a clock output, the frequency of the controlled oscillator being controlled by an output of the filter.

As the first buffer controls the range of cell rates supplied to the second buffer, once locked, the phase locked loop can provide a stable output frequency locked substantially to the service clock frequency fs.

Preferably, the filter comprises a fill level counter for determining a current fill level of the second buffer, a memory for a prior fill level value and a comparator for comparing the current and prior fill levels, the comparator outputting a control signal for modifying an output frequency of the controlled oscillator when the current fill level is higher than the prior fill level by more than a first amount or is less than the prior fill level by more than a second amount. The first and second amounts can be the same or different, and can be expressed in absolute or percentage terms are required.

Rather than comparing each current fill level sample to the immediately previous fill level sample, the prior fill level is preferably a fill level from a previous modification instant, that is the fill level at an instant at which the output frequency of the phase locked loop was last changed.

Preferably, the controlled oscillator is a digitally controlled oscillator.

Optionally, one or more intermediate fill level controlled buffers may be provided in line between the coarse fill level controlled buffer and the fine fill level controlled buffer to provide different degrees of filtering.

The invention also provides an ATM receiver circuit and an integrated circuit comprising a mechanism as set out above.

The invention further provides an ATM receiver comprising a mechanism according as set out above.

In accordance with another aspect of the invention, there is provided an adaptive clock recovery method for an ATM receiver for recovering a service clock transmitted via the ATM network, the method comprising:

a) reducing cell jitter in a stream of cells by inputting the cells to a first buffer and reading the cells from the first buffer at selectable rates depending on fill levels of the first buffer to provide course control of the read out rate;

b) passing cells from the first buffer to a second buffer; and c) monitoring a fill level of the second buffer for causing a rate of output of the second buffer to be locked substantially to the service clock frequency.

Preferably, step (a) comprises:

selectively supplying one of at least a first and a second clock frequency for outputting cells from the first buffer in response to a current fill level of the first buffer.

Preferably, step (c) comprises:

(i) filtering fill level signals from the second buffer; and (ii) controlling an oscillator to generate a clock signal for reading cells from the second buffer locked substantially to the service clock frequency.

More preferably, step (c)(i) comprises:

determining a current fill level for the second buffer;

comparing the current second buffer fill level to a previously stored prior second buffer fill level; and outputting a control signal for modifying an output frequency of the controlled oscillator when a difference between the current and prior fill levels exceeds a given amount.

In one embodiment, step (b) comprises passing the output of the first buffer directly to the input of the second buffer.

Alternatively, step (b) can comprise one or more intermediate filter steps between steps (a) and (b).

In accordance with a further aspect of the invention, there is provided a method of circuit emulation for CBR services over an ATM network, the method comprising, at an ATM transmitter, transmitting a stream of ATM cells for a CBR source application having a predetermined service clock, and, at an ATM receiver:

a) receiving said stream of ATM cells;

b) reducing cell jitter in said stream of cells by inputting the cells to a first buffer and reading the cells from the first buffer at selectable rates depending on fill levels of the first buffer to provide course control of the read out rate;

c) passing cells from the first buffer to a second buffer; and d) monitoring a fill level of the second buffer for causing a rate of output of the second buffer to be locked substantially to the frequency of said predetermined service clock of the CBR source application.

An embodiment of the invention will be described hereinafter, by way of example only, with reference to the accompanying drawings in which.

Figure 1:
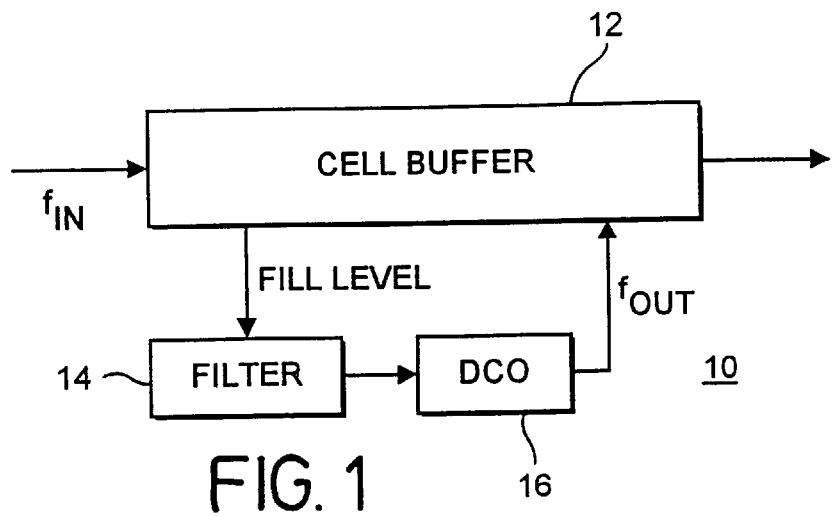
FIG. 1 is a schematic block diagram of a proposed adaptive clock recovery mechanism.
Figure 2A:
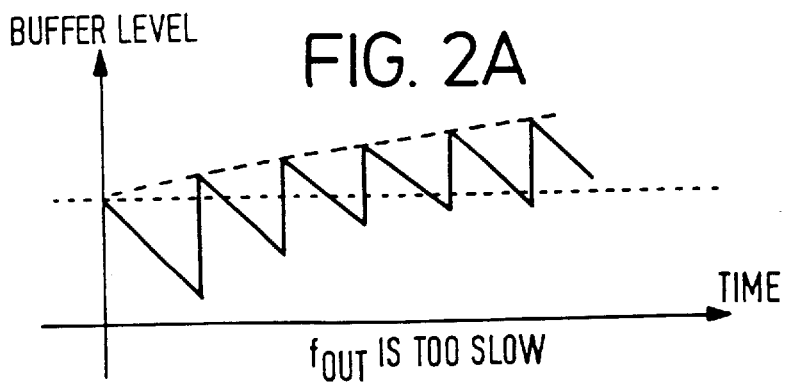
FIGS. 2A and 2B are graphs illustrating the operation of the mechanism of FIG. 1.
Figure 2B:
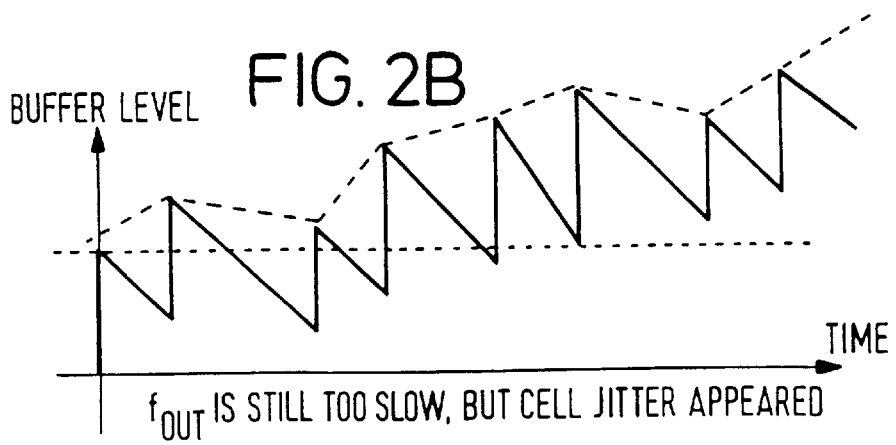
Figure 3:
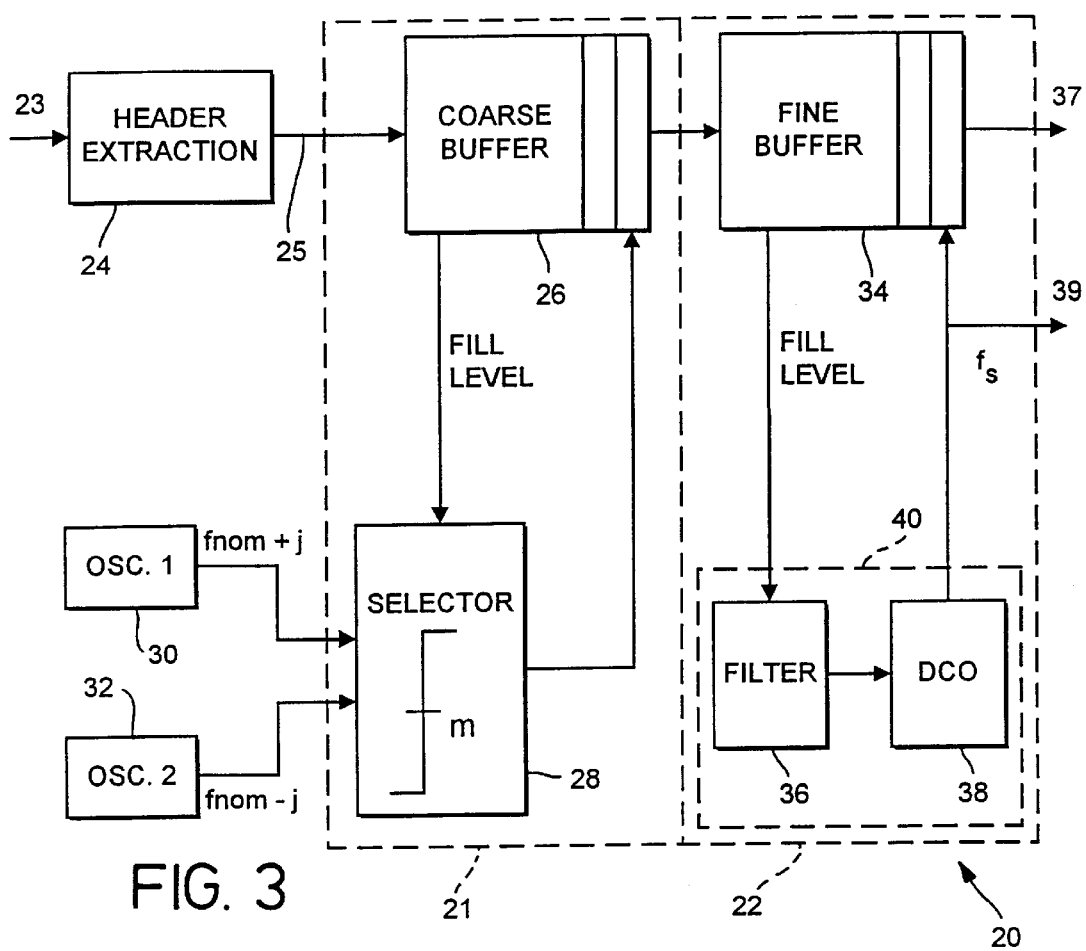
FIG. 3 is a schematic block diagram of an embodiment of an adaptive clock recovery mechanism in accordance with the invention.

FIG. 3 illustrates an example of an adaptive clock recovery mechanism 20 in accordance with the present invention. An incoming stream of ATM cells headers can be received from an SAR header extractor 24 connected to receive ATM cells from a telecommunications line 23. As shown in FIG. 3, the mechanism 20 comprises two buffer levels, or stages 21 and 22. The first buffer stage 22 comprises a coarse buffer 26 which receives the incoming cell 25 and acts as a low-pass filter to reduce cell jitter. A selector 28 is connected to monitor the fill level of the coarse buffer 26 (for example by comparing the value of in and out pointers for the coarse buffer 26). The buffer 26 is configured as a FIFO memory in storage having separate in and out pointers for the next write location and the next read location, respectively. The fill level can thus be determined by comparing in and out pointers of the values. The selector selects either a first frequency fnom+j from a first oscillator 30 or a second frequency fnom−j from a second oscillator 32 to be supplied to the coarse buffer 26 for controlling the output of cells from the course buffer 26. Although two oscillators are shown in FIG. 3, the oscillators could be replaced by a single oscillator and appropriate frequency modification logic. Alternatively, the selector 28 and oscillators 30 and 32 could be embodied as a controllable oscillator for outputting either the first or the second frequency in response to the input provided thereto.

If the level of the coarse buffer 26 is over a given value m, it is emptied at a frequency of fnom+j ppm. On the other hand, if the level of the coarse buffer 26 goes below this value, the coarse buffer 26 is emptied at fnom−j ppm. fnom is the nominal source frequency (i.e 2,048 Mbits/s for E1 connection and 1,536 Mbit/s for DS1). The value of j is chosen so that the maximum empty frequency stays equal or over the tolerated maximum service clock frequency and the minimum empty frequency stays equal or below the minimum service clock frequency. Accordingly, the buffer level is kept between defined bounds (given by the cell delay variation (CDV)), in normal operating mode. In the long term the average of the output frequency of the coarse buffer converges to the source frequency fs.

The output stream of the coarse buffer 26 of the first buffer stage 21 is then fed to a second, fine, buffer 34, in the second buffer stage 22. The buffer 34 is configured as a FIFO memory in storage having separate in and out pointers for the next write location and the next read location, respectively. The fill level can thus be determined by comparing in and out pointers of the values. The fill level of the fine buffer 34 is used to drive a phase locked loop (PLL) 40 including a filter 36 and a digitally controlled oscillator 38. Once the PLL 40 has achieved lock, and if the PLL filter 36 is properly dimensioned, the output frequency exhibits little variation around fs and on average, stays at fs, with acceptable jitter performance. Cells are therefore clocked from the fine buffer 26 at 37 at substantially the service clock frequency fs. The generated clock frequency from the DCO 38 can be output at 39 for subsequent circuit emulation circuitry or the like.

To demonstrate the operation of the clock recovery mechanism of FIG. 3, consider a worst case scenario, namely when a burst of cells is fed into the coarse buffer. The maximum size of such a cell burst is given by:

$$N=CDV/Tcell$$

with Tcell=1/fs×Scell and where SCell is the size (in bits) of a cell (i.e. 424 bits).

The value m which provides the threshold of the selector 28 should be at least equal to N and the size of coarse buffer should at least equal to two times N to avoid cell starvation and overflow which could lead to a dramatic clock recovery situation.

To drive the PLL 40, the fill-level of the fine buffer 34 is sampled every E byte arrivals. If the level difference between the current sample and the previous sample exceeds a threshold thd, the output frequency of the PLL is modified by or below a fixed increment i, as explained with reference to FIG. 4.

Figure 4:
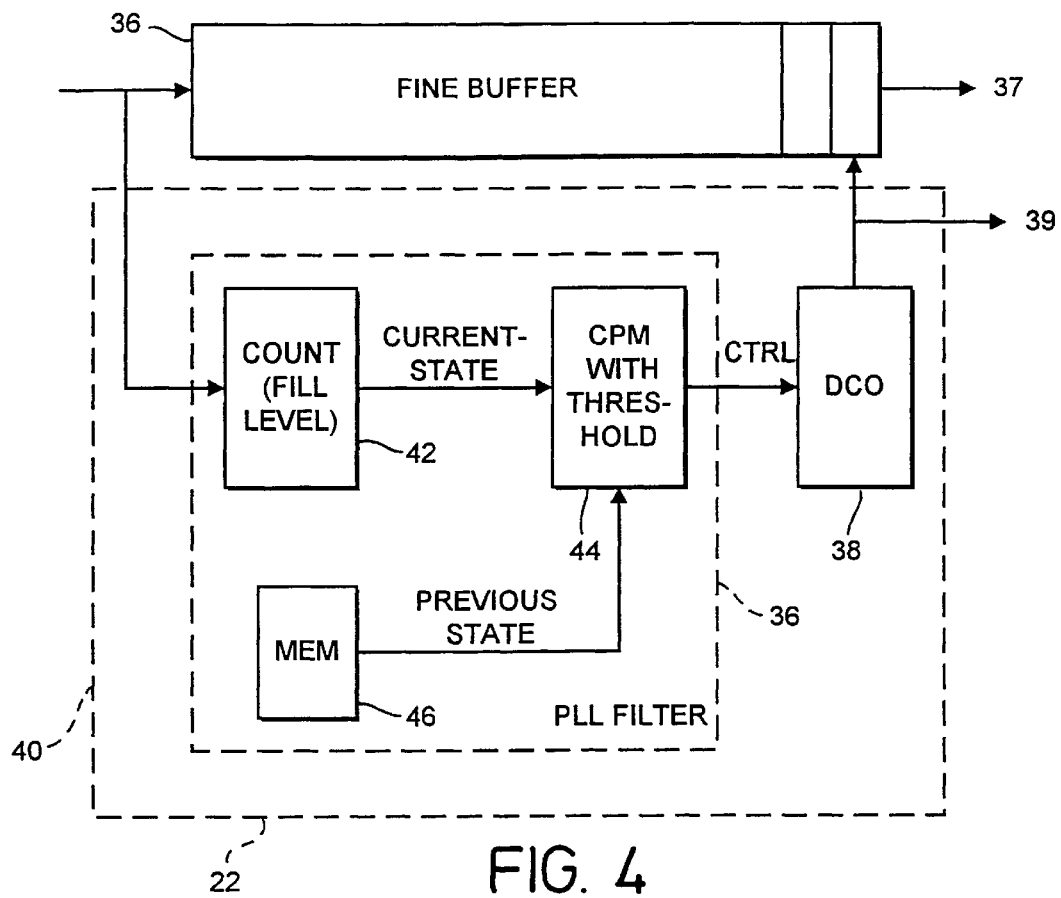
FIG. 4 is a detail of the mechanism of FIG. 3.

FIG. 4 illustrates in more detail the structure of the PLL 40, and in particular the PLL filter 36. The PLL filter 36 comprises a comparator (CMP) 44, which compares a current fill level determined by a fill level counter 42 to a value stored in a memory 46. The value stored in the memory 46 represents the fill level at a previous modification instant. Thus, the comparison between buffer levels is not done between two consecutive sampling instants, but between the current instant, and a previous modification instant (i.e., when the PLL output frequency was last modified), making sure that a decision is taken each time the buffer level varies of a quantity greater than thd or less than −thd. Nevertheless, an urgency procedure is set in order to speed up the PLL 40 output frequency if the fine buffer fill level goes beyond or below a given limit to avoid cases of starvation or overflow. It is to be expected that the fine buffer level will raise or lower in significant proportions before stabilizing when lock is achieved.

Thus, the comparator 44 outputting a control signal for modifying an output frequency of the DCO 38 when the current fill level is higher than the prior fill level by more than a first amount (thd) or is less than the prior fill level by more than a second amount (−thd). The first and second amounts can be the same or different, and could be expressed in percentage rather than absolute terms.

Careful choice of the threshold thd, the values E and i allows the PLL 40 to lock in a reasonable time. The stability of the output frequency once lock is achieved, is determined by the threshold thd. To explain the operation of the PLL 40, assume that lock is achieved at a frequency fnom+e and that the coarse and fine buffer are empty at the arrival of the first cell. If lock is achieved, the PLL 40 output frequency toggles between fnom+ai and fnom+(a+1)i, where a is an integer given by:

$$ai \leq E \leq (a+1)i$$

Under normal operation, the coarse buffer 26 output frequency toggles quite frequently between fnom+j and fnom−j. On some occasions, however, it can spend significant time at one extreme.

Assume fout=(a+1)i (locked to a slightly superior frequency).

Then for a given CDV, the coarse buffer output frequency fc cannot stay fixed to the same value (fn+j or fn−j) more than CDV seconds. In the worst case, when fn+j is exactly the upper bound on the service clock frequency, fc stays at its higher value during T seconds. Then T(j−(a+1)i) bits is finally accumulated. For an optimal filtering (i.e. toggle between only two states), the threshold thd must be over this value. An estimation of the maximum value for T, assuming the buffer at medium level when the first cell burst occurs and CDV>TCell, is given by:

$$T=SCell \times ((CDV/TCell)/(fnom+j))$$

The above equation represents the time taken to empty the buffer filled with an initial maximum size burst, where SCell is the size (in bits) of a cell (i.e. 424 bits).

The threshold thd should also be large enough that the fine buffer level lowering, that goes with long periods without cell arrival, is filtered.

If CDV is not too large, thd is not higher than 2 or 3 bits for most of the time.

The adaptive clock recovery mechanism described herein could be implemented at least in part by software operating on conventional computing hardware, although in preferred embodiments it is implemented by means of special purpose circuit technology. The adaptive clock recovery mechanism can be implemented in any appropriate circuit technology, typically as an integrated circuit, for example using ASIC technology in a manner which will be appropriate to one skilled in the art.

Figure 5:
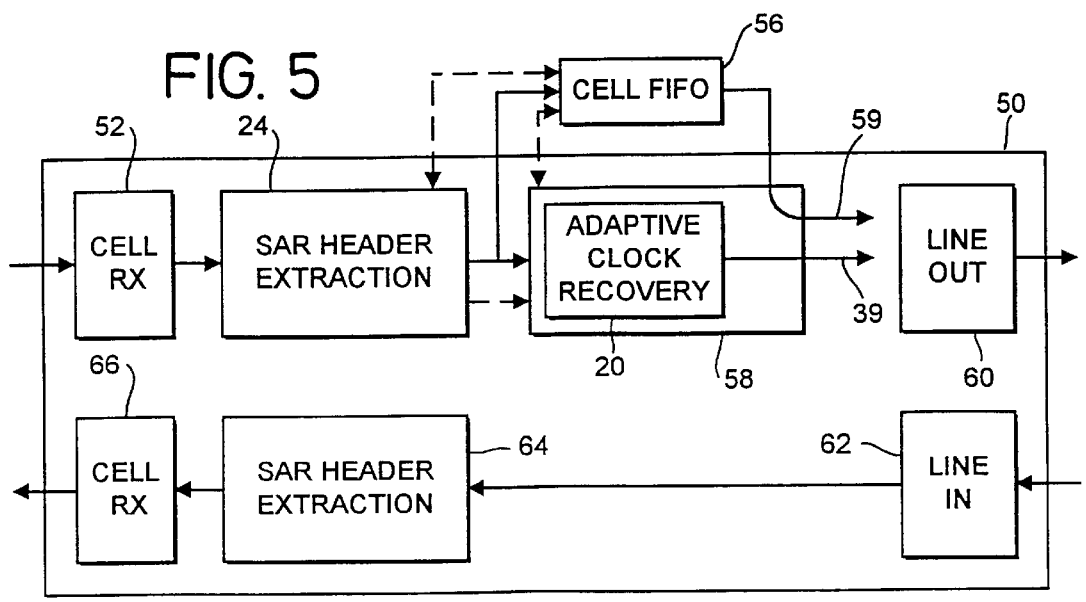
FIG. 5 is a schematic diagram of an integrated circuit comprising the clock recovery mechanism of FIG. 2.

FIG. 5 is a schematic block representation of an integrated circuit 50 comprising the adaptive clock recovery mechanism 20 of FIG. 3. In FIG. 5 certain functional blocks are represented which are related to the clock recovery mechanism 20. The integrated circuit 50 can comprise further functional elements according to the specific application of the integrated circuit. In FIG. 5, a cell receiver circuit 52 receives cells from an ATM network. The output of the cell receiver circuit 52 is passed to an SAR header extractor 24, which extracts the header information. The cell data is buffered in a cell FIFO 56. The cell header data is passed to the adaptive clock recovery mechanism 20 of FIG. 3. Further control circuitry 58, not shown, can be associated with the adaptive clock mechanism 20. The recovered service clock 39 output from the adaptive clock recovery mechanism is associated with the cell data buffered in the cell FIFO 56 and can be passed to circuitry downstream thereof. The downstream circuitry can be formed of or comprise line out circuit 56 for local data output as well as other circuitry (not shown). Control signal lines are represented by dashed lines in FIG. 5. FIG. 5 also shows a line input 62 for local data input, an SAR header generator 64 and a cell transmission circuit 66 (all of which can be of a conventional design) for transmitting cells to the ATM network.

The integrated circuit, or discrete circuits, could be implemented on, for example, a multimedia interface card for providing voice, etc.

Figure 6:
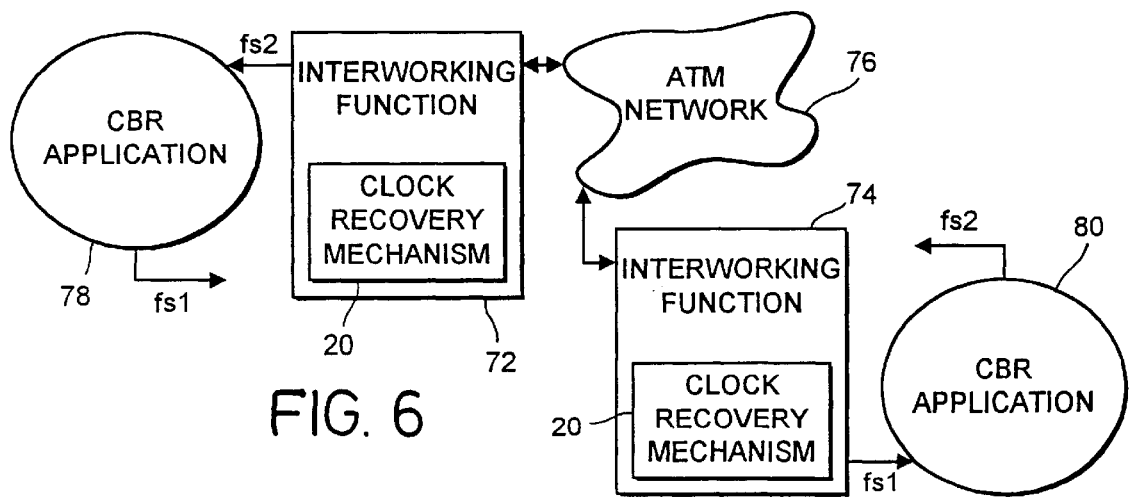
FIG. 6 is a schematic diagram of an ATM transmitter and an ATM receiver incorporating the clock recovery mechanism of FIG. 2.

FIG. 6 is schematic overview of an ATM circuit emulation system in which an embodiment of the present invention may be incorporated. As shown in FIG. 6, first and second interworking function units 72 and 74 communicate with each other via an ATM network 76. Each of the interworking function units 72 includes a clock recovery mechanism as described earlier. The clock recovery mechanism 20 can be implemented as any suitable device (e.g., an integrated circuit with clock recovery logic for implementing the functions described above on a computer adapter card). The first interworking function unit 72 provides an interface between a CBR application 78 having a first service frequency fs1 and the ATM network. The second interworking function unit 74 provides an interface between a second CBR application 80 having a second service frequency fs2 and the ATM network. The clock recovery mechanism 20 in the second interworking function unit 74 enables the first service clock fs1 to be recovered at the second interworking function unit 74. The clock recovery mechanism 20 in the first interworking function unit 72 enables the second service clock fs2 to be recovered at the first interworking function unit 74. In this way circuit emulation can be performed via the ATM network. The interworking function units supporting the CBR applications can be any appropriate information processing devices as required for a particular installation, including, by way of example only, computers such as workstations, computer servers, mainframe computers, or video equipment, voice equipment, I/O interface cards for such devices, and so on.

Thus, there has been described a digital clock recovery technique for circuit emulation over an ATM network with output jitter reduction. There has been described, at an ATM receiver, adaptive clock recovery of a CBR application service clock. The fill level of a first buffer receiving a stream of cells is used to provide coarse control of the rate of output of a stream of cells from the first buffer. The fill level of a further, fine, buffer receiving said stream of cells from the first buffer is monitored for determining a clock frequency, corresponding to the service clock frequency, for outputting cells from the fine buffer. The first buffer fill level control provides low pass cell jitter filtering by selectively supplying a first or a second clock frequency for outputting cells from the first buffer. The fine filter fill level control employs a phase locked loop responsive to the current fill level to set a clock frequency for reading out said fine buffer at the service clock frequency. Simulations have demonstrated that embodiments of the invention can recover source frequency at the receiver, under hard conditions, with jitter and wander on the regenerated clocks in the bounds defined by ITU-T. Embodiments of the invention are simple to implement and do not rely on any external clock. Acquisition time of the reception PLL 40 can be significant, but still acceptable.

Although a particular embodiment of the invention has been described, it will be appreciated that many modifications, alterations and substitutions may be made within the scope of the invention.

What is claimed is:

1. An adaptive clock recovery mechanism for an ATM receiver for recovering a service clock transmitted via an ATM network, said service clock having a service clock frequency associated therewith, said mechanism comprising:

a first buffer having an input for receiving successive ATM cells from said ATM network, and further having an output;

a first buffer fill level controller connected to said first buffer for controlling rates of cell output from said first buffer to be within a predetermined range;

a second buffer having an input connected to receive cells from said output of said first buffer, and further having an output; and a second buffer fill level controller connected to said second buffer to cause a rate of cell output from said second buffer to be locked substantially to said service clock frequency.

2. An adaptive clock recovery mechanism according to claim 1, wherein said first buffer fill level controller comprises a selectable clock source for supplying a selectable one of at least a first and a second clock frequency for outputting cells from said first buffer, said selectable clock source being responsive to a fill level of said first buffer to select one of said clock frequencies.

3. An adaptive clock recovery mechanism according to claim 2, wherein said first clock frequency has a frequency of fnom+j ppm and said second clock frequency has a frequency of fnom−j ppm, where fnom is a nominal service transmission frequency and 2j defines a maximum permissible range.

4. An adaptive clock recovery mechanism according to claim 2, wherein said selectable clock source selects said first clock frequency when a fill level of said first buffer is greater than a threshold value and selects said second clock when a fill level of said first buffer is less than said threshold value.

5. An adaptive clock recovery mechanism according to claim 2, wherein said selectable clock source comprises a selector having at least first and second clock inputs for respective clock frequencies, a clock output for outputting a clock frequency for controlling the reading of cells from said first buffer and a first buffer fill level input, said selector being arranged to determine a fill level of said first buffer and to connect a selected one of said clock inputs to said clock output for supplying a selected clock frequency for controlling said cell output from said first buffer.

6. An adaptive clock recovery mechanism according to claim 1, wherein said second buffer fill level controller comprises a phase locked loop, said phase locked loop comprising a filter connected to said second buffer to determine a fill level of said second buffer and a controlled oscillator for providing a clock signal for reading cells from said second buffer, said controlled oscillator having a control input and a clock output, the frequency of said controlled oscillator being controlled by an output of said filter.

7. An adaptive clock recovery mechanism according to claim 6, wherein said filter comprises a fill level counter for determining a current fill level of said second buffer, a memory for a prior fill level value and a comparator for comparing said current and prior fill levels, said comparator outputting a control signal for modifying an output frequency of said controlled oscillator when the current fill level is higher than the prior fill level by more than a first amount or is less than the prior fill level by more than a second amount.

8. An adaptive clock recovery mechanism according to claim 7, wherein said prior fill level is a fill level at a previous modification instant.

9. An adaptive clock recovery mechanism according to claim 6, wherein an output of said comparator is connected to a control input of said controlled oscillator.

10. An adaptive clock recovery mechanism according to claim 6, wherein said controlled oscillator is a digitally controlled oscillator.

11. An adaptive clock recovery mechanism according to claim 1, further comprising one or more intermediate fill level controlled buffers in line between said flat fill level controlled buffer and said second fill level controlled buffer.

12. An ATM receiver circuit comprising a mechanism according to claim 1.

13. An ATM receiver integrated circuit comprising a mechanism according to claim 1.

14. An ATM receiver comprising a mechanism according to claim 1.

15. An adaptive clock recovery method for an ATM receiver for recovering a service clock transmitted via an ATM network, said method comprising:
   a) reducing cell jitter in a stream of cells by inputting said cells to a first buffer and reading said cells from said first buffer at selectable rates depending on fill levels of said first buffer to a second buffer; and
   b) passing cells from said first buffer to a second buffer; and
   c) monitoring a fill level of said second buffer for causing a rate of output of said second buffer to be locked substantially to a frequency of said service clock.

16. An adaptive clock recovery method according to claim 15, wherein step (a) comprises:
   selectively supplying one of at least a first and a second clock frequency for outputting cells from said first buffer in response to a current fill level of said first buffer.

17. An adaptive clock recovery method according to claim 15, wherein said first clock frequency has a frequency of fnom+j ppm and said second clock frequency has a frequency of fnom−j ppm, where fnom is a nominal service transmission frequency and 2j defines a maximum permissible frequency range for the rate of cell output from said first buffer.

18. An adaptive clock recovery method according to claim 16, wherein said first clock frequency is selected when a fill level of the first buffer is greater than a threshold value and said second clock frequency is selected when a fill level of said first buffer is less than said threshold value.

19. An adaptive clock recovery method according to claim 15, wherein step (c) comprises:
   (i) filtering fill level signals from said second buffer; and
   (ii) controlling an oscillator to generate a clock signal for reading cells from said second buffer locked substantially to said service clock frequency.

20. An adaptive clock recovery method according to claim 19, wherein said step (c)(i) comprises:
   determining a current fill level for said second buffer;
   comparing said current second buffer fill level to a previously stored prior second buffer fill level; and
   outputting a control signal for modifying an output frequency of said oscillator when the current fill level is higher than the prior fill level by more than a first amount or is less than the prior fill level by more than a second amount.

21. An adaptive clock recovery method according to claim 19, wherein said prior fill level is a fill level at a previous modification instant.

22. An adaptive clock recovery method according to claim 20, wherein said comparison output forms a control input for said oscillator.

23. An adaptive clock recovery method according to claim 15, wherein step (b) comprising passing the output of the first buffer directly to the input of the second buffer.

24. An adaptive clock recovery method according to claim 15, wherein step (b) comprising one or more intermediate filter steps between steps (a) and (b).

25. A method of circuit emulation for CBR services over an ATM network, the method comprising, at an ATM transmitter, transmitting a stream of ATM cells for a CBR source application having a predetermined service clock, and, at an ATM receiver:
   a) receiving said stream of ATM cells;
   b) reducing cell jitter in said stream of cells by inputting the cells to a first buffer and reading the cells from the first buffer at selectable rates depending on fill levels of the first buffer to provide course control of the read out rate;
   c) passing cells from the first buffer to a second buffer; and
   d) monitoring a fill level of the second buffer for causing a rate of output of the second buffer to be locked substantially to the frequency of said predetermined service clock of the CBR source application.

* * * * *